United States Patent
Howcroft et al.

(10) Patent No.: US 9,648,379 B2
(45) Date of Patent: May 9, 2017

(54) COMPLIMENTARY CONTENT BASED RECORDING OF MEDIA CONTENT

(75) Inventors: Jerald Robert Howcroft, Beverly Hills, MI (US); Stephanie Karasick Acuna, Austin, TX (US); Alyssa L. Williams, Elmhurst, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 163 days.

(21) Appl. No.: 13/492,966

(22) Filed: Jun. 11, 2012

(65) Prior Publication Data
US 2013/0332953 A1    Dec. 12, 2013

(51) Int. Cl.
| | |
|---|---|
| G06F 3/00 | (2006.01) |
| H04N 21/433 | (2011.01) |
| H04N 21/482 | (2011.01) |
| H04N 21/4788 | (2011.01) |
| H04N 21/466 | (2011.01) |
| H04N 21/2747 | (2011.01) |
| H04N 21/41 | (2011.01) |
| H04N 21/4147 | (2011.01) |

(52) U.S. Cl.
CPC ..... *H04N 21/4334* (2013.01); *H04N 21/4667* (2013.01); *H04N 21/4668* (2013.01); *H04N 21/4788* (2013.01); *H04N 21/4828* (2013.01); H04N 21/2747 (2013.01); H04N 21/4135 (2013.01); H04N 21/4147 (2013.01); H04N 21/4662 (2013.01)

(58) Field of Classification Search
CPC ........... H04N 21/2183; H04N 21/4135; H04N 21/442; H04N 21/4622; H04N 21/4782; H04N 21/4334; H04N 21/4828

USPC .................................................. 725/39–61
See application file for complete search history.

(56) References Cited

U.S. PATENT DOCUMENTS

| | | | | |
|---|---|---|---|---|
| 7,895,625 | B1* | 2/2011 | Bryan ................... | H04N 5/782 725/46 |
| 8,856,855 | B2* | 10/2014 | Goergen ............ | H04N 7/17318 725/110 |
| 2002/0174430 | A1* | 11/2002 | Ellis et al. ....................... | 725/46 |
| 2004/0117831 | A1* | 6/2004 | Ellis et al. ....................... | 725/53 |
| 2005/0138659 | A1* | 6/2005 | Boccon-Gibod et al. ...... | 725/58 |
| 2007/0074245 | A1* | 3/2007 | Nyako ............... | H04N 5/44543 725/34 |
| 2008/0066111 | A1* | 3/2008 | Ellis ................... | H04N 5/44543 725/57 |

(Continued)

*Primary Examiner* — Farzana Hossain
(74) *Attorney, Agent, or Firm* — Toler Law Group, PC

(57) ABSTRACT

A particular method includes receiving search criteria and storage criteria associated with a user. Based on the search criteria, a search of program content metadata associated with programs is performed. The method further includes identifying, based on the search, one or more particular programs that satisfy the search criteria. The method includes determining whether the storage criteria would be satisfied if the one or more particular programs were recorded. The method includes, in response to determining that the storage criteria would not be satisfied if the one or more particular programs were recorded, sending a notification to the user indicating that the storage criteria would not be satisfied. In response to determining that the storage criteria would be satisfied if the one or more particular programs were recorded, automatically scheduling recordings of the one or more particular programs.

20 Claims, 7 Drawing Sheets

(56) References Cited

U.S. PATENT DOCUMENTS

| | | |
|---|---|---|
| 2008/0276279 A1* | 11/2008 | Gossweiler et al. ............ 725/46 |
| 2009/0100478 A1* | 4/2009 | Craner et al. .................. 725/87 |
| 2009/0165054 A1* | 6/2009 | Rudolph ........................ 725/46 |
| 2012/0030586 A1 | 2/2012 | Ketkar |
| 2012/0030587 A1 | 2/2012 | Ketkar |
| 2012/0036523 A1* | 2/2012 | Weintraub et al. ............... 725/9 |
| 2012/0047525 A1* | 2/2012 | Campagna ......... H04N 21/4532 725/16 |
| 2012/0240145 A1* | 9/2012 | Day ............................... 725/14 |

* cited by examiner

COMPLIMENTARY CONTENT BASED RECORDING OF MEDIA CONTENT

FIELD OF THE DISCLOSURE

The present disclosure is generally related to recording media content based on identification of complimentary content.

BACKGROUND

A media recorder may enable a user to record media content so that the media content can be viewed at a time after the media content has been broadcasted. The media recorder may record programs identified in an electronic programming guide. Storage space utilized by the media recorder may be limited, causing the media recorder's recording capability to be limited to a particular number of programs based on availability of the storage space. Thus, the user may manage scheduled recordings and storage space allocation to address the media recorder's limited storage capacity.

DETAILED DESCRIPTION

Figure 1:
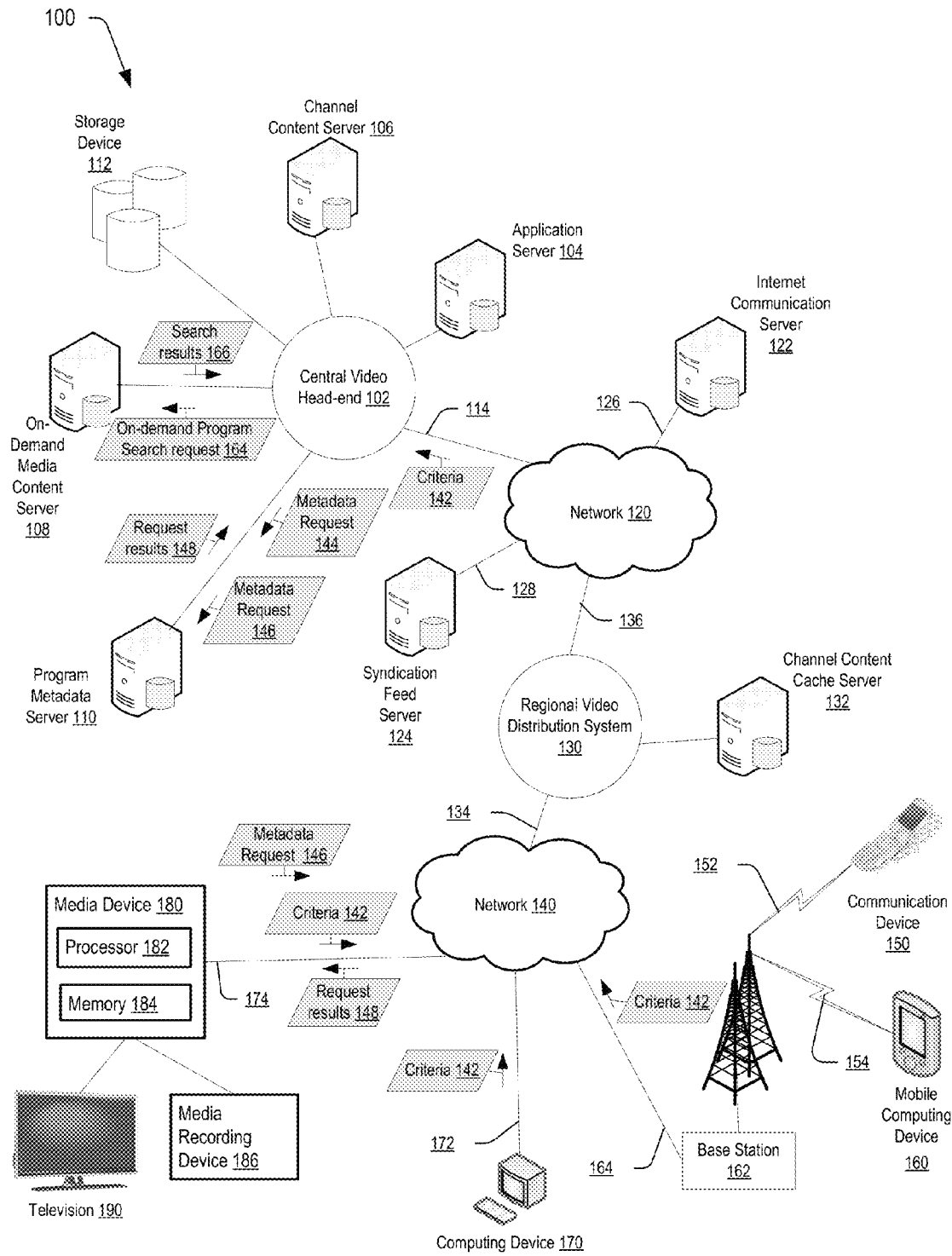
FIG. 1 is a diagram of a particular embodiment of a system to automatically record programs based on search criteria.

In a particular embodiment, a method includes receiving search criteria and storage criteria. The method includes performing a search, based on the search criteria, of program content metadata associated with programs. The method further includes identifying, based on the search, one or more particular programs that satisfy the search criteria. The method includes determining whether the storage criteria would be satisfied if the one or more particular programs were recorded. The method includes, in response to determining that the storage criteria would not be satisfied if the one or more particular programs were recorded, sending a notification to the user indicating that the storage criteria would not be satisfied. In response to determining that the storage criteria would be satisfied if the one or more particular programs were recorded, the method automatically schedules recordings of the one or more particular programs.

In another particular embodiment, a system includes a processor and a memory accessible to the processor. The memory includes instructions that, when executed by the processor, cause the processor to perform a method that includes automatically generating search criteria based on information obtained from a social network account associated with a user. The method includes receiving storage criteria associated with the user. The method further includes performing a search, based on the automatically generated search criteria, of program content metadata associated with programs. The method includes, based on the search, identifying one or more particular programs that satisfy the automatically generated search criteria. The method further includes determining whether the storage criteria would be satisfied if the one or more particular programs were recorded. The method includes, in response to determining that the storage criteria would not be satisfied if the one or more particular programs were recorded, sending a notification to the user indicating that the storage criteria would not be satisfied. The method includes, in response to determining that the storage criteria would be satisfied if the one or more particular programs were recorded, automatically scheduling recordings of the one or more particular programs.

In another particular embodiment, a computer-readable medium includes operational instructions that, when executed by a processor, cause the processor to perform a method including automatically generating search criteria based on information obtained from a social network account associated with a user. The method includes receiving storage criteria associated with the user. The method further includes performing a search, based on the automatically generated search criteria, of program content metadata associated with programs. The method includes, based on the search, identifying one or more particular programs that satisfy the automatically generated search criteria. The method further includes determining whether the storage criteria would be satisfied if the one or more particular programs were recorded. The method includes, in response to determining that the storage criteria would not be satisfied if the one or more particular programs were recorded, sending a notification to the user indicating that the storage criteria would not be satisfied. The method includes, in response to determining that the storage criteria would be satisfied if the one or more particular programs were recorded, automatically scheduling recordings of the one or more particular programs.

Referring to FIG. 1, a particular embodiment of a system 100 to automatically record programs based on search criteria is shown. More specifically, the system 100 illustrates interaction of one or more devices (e.g., a communication device 150, a mobile computing device 160, a computing device 170, and a media device 180) to automatically record programs distributed by a central video head-end 102, which receives the programs from one or more video sources (e.g., on-demand media content server 108 or channel content server 106). Using the one or more devices, a user can provide search criteria and storage criteria to a media device 180 or a central video head-end 102. The search criteria may define types of programs that are to be automatically scheduled for recording. The storage criteria may define how storage allocation and management is to be performed with respect to the programs that are recorded as a result of the automatic scheduling. As discussed in detail further below, the media device 180, the central video head-end 102, or a combination thereof may perform a query of program content metadata associated with programs that are available from the one or more video sources to identify the particular programs that satisfy the search criteria. The system 100 also illustrates how the one or more devices may receive notifications when the storage criteria may not be satisfied based on the particular programs that are identified from the search criteria.

The system 100 includes the central video head-end 102. The central video head-end 102 may include or be operatively coupled to an application server 104, a channel content server 106, an on-demand media content server 108, a program metadata server 110, a storage device 112, or a combination thereof. The application server 104, the channel content server 106, the on-demand media content server 108, the program metadata server 110, and the storage device 112 may be collectively referred to as components of the central video head-end 102.

The central video head-end 102 may be communicatively coupled to a network 120. The network 120 may be communicatively connected to an Internet communication server 122, a syndication feed server 124, a regional media distribution system 130, or a combination thereof. The regional media distribution system 130 may include or be operatively coupled to a channel content cache server 132. The regional media distribution system 130 may also, or in the alternative, be communicatively coupled to a network 140. The network 140 may be communicatively coupled to one or more devices associated with a user (e.g., a subscriber associated with the system 100). In FIG. 1, the one or more devices are illustrated by representative devices that include, but are not limited to, a communication device 150, a mobile computing device 160, a computing device 170, a media device 180, or a combination thereof. The media device 180 may be operatively coupled to, or may include, a media recording device 186. The media device 180 may also, or in the alternative, be operatively coupled to one or more display devices 190. The one or more display devices 190 may include a television.

The central video head-end 102 may provide media content from one or more video sources (such as the channel content server 106 and the on-demand media content server 108) to the one or more devices 150, 160, 170, 180 associated with the user. Additionally, the one or more devices 150, 160, 170, 180 may receive information associated with the media content from the central video head-end 102. The central video head-end 102 may provide access to the media content and to the information associated with the media content via one or more applications that execute at the one or more devices 150, 160, 170, 180.

The application server 104 may include or be included within one or more computing devices. The application server 104 may facilitate interaction and communication, and may manage information exchanged between one or more components 104, 106, 108, 110, 112 of the central video head-end 102. The application server 104 may provide one or more applications or application interfaces to other components of the system 100. An application may include, for example, a graphical user interface (GUI) that enables a user to interact with one or more components of the system 100 (e.g., to specify storage and/or search criteria). The application server 104 may also provide the user with information associated with the media content. For example, the information may include contents of an electronic programming guide (EPG). The application server 104 may facilitate interaction and communication from one or more applications accessed by the one or more devices 150, 160, 170, 180. A particular application provided by the application server 104 may support location and determination of one or more programs that may be accessible to the user via the central video head-end 102. The application server 104 may also host or provide a media recorder application that supports media recording functions, such as scheduling and management of recordings of the media content. The media recording application may enable the user to specify criteria 142, such as recording criteria, notification criteria, storage criteria, or a combination thereof that may be used to locate, choose, schedule, and record the media content. The criteria 142 may be stored locally at the application server 104 or at the storage device 112. The user may be able to operate and manage the media recording functions via any of the one or more devices 150, 160, 170, 180, 186 and 190.

In a particular embodiment, the channel content server 106 may enable the central video head-end 102 to access media programs that are available on one or more media channels accessible via the channel content server 106. The channel content server 106 may include one or more computing devices that may be associated with a storage device. The channel content server 106 may provide program information that identifies one or more media programs that are scheduled to be broadcasted via the one or more media channels. The one or more media programs may be associated with one or more media data streams. The program information may include, but is not limited to, scheduling information about a program, channel information, program series information, or a combination thereof. For example, the channel content server 106 may provide an EPG, or portions thereof, to the application server 104. In a particular embodiment, the channel content server 106 may include an application program interface (API) that an application may use to access the program information. The application server 104 may access the program information to obtain scheduling information of the one or more media programs to determine whether the one or more media programs may be scheduled for recording. The channel content server 106 may provide to the application server 104 periodic updates of the media programs, the program information, or both. The periodic updates may be performed automatically or by a batch process manually initiated by an operator of the central video head-end 102.

The on-demand media content server 108 provides the central video head-end 102 with access to on-demand media content and on-demand media content information. The on-demand media content server 108 may include one or more computing devices that may be associated with a storage device. In a particular embodiment, the on-demand media content server 108 is a video on-demand (VoD) content server that provides access to on-demand video content. The on-demand media content server 108 may store the on-demand media content, metadata associated with the on-demand media content, other data associated with the on-demand media content, such as a catalog of available on-demand media content, or a combination thereof. In a particular embodiment, the central video head-end 102 may send an on-demand program search request 164 to the on-demand media content server 108 to perform a search of the on-demand media content for the programs to determine whether the criteria 142 specified by the user are satisfied. Search results 166 indicating one or more programs located based on the on-demand program search request 164 may be sent to the central video head-end 102.

The program metadata server 110 may provide the central video head-end 102 with access to program content metadata. The program content metadata may be stored in one or more databases coupled to the program metadata server 110. The program metadata server 110 may receive requests, such as a request to perform a query of the program content metadata based on search criteria. The search criteria may include criteria based at least in part on one or more categories associated with the complimentary content metadata, such as those categories identified above. For example, the search criteria may be based on the user's preference for programs associated with one or more of the categories of the complimentary content metadata. The search criteria may also, or in the alternative, include program series information that indicates program subscription options, such as a type of episode (e.g., new or old) and a series subscription. Further, the search criteria may include general program information, such as episode genre, category of programming, topic of programming, program type, or a combination thereof. The search criteria may include time related criteria to identify programs that are scheduled to be broadcast at a particular time and/or data. The time related criteria may indicate a particular recording date that defines a date up to when recordings are to be automatically scheduled.

In a particular embodiment, the central video head-end 102 may send a metadata request 144 to the program metadata server 110 for the program content metadata. The program metadata server 110 may send request results 148, which contain the program content metadata, for the metadata request 144 to the central video head-end 102. The central video head-end 102 may perform a query on the program content metadata to identify programs based on search criteria of the criteria 142. Alternatively, the central video head-end 102 may send the metadata request 144 to the program metadata content server 110 to perform a query of the program content metadata based on the search criteria. The request results 148 for the metadata request 144 may be sent to the central video head-end 102. In this embodiment, the request results 148 may contain results of the query performed by the program metadata server 110 based on the search criteria. In another embodiment, the media device 180 may send a metadata request 146 to the central video head-end 102 to perform a query of the program content metadata based on the search criteria of the criteria 142 received by the media device 180. The metadata request 146 may include the search criteria. In response to receiving the metadata request 146, the central video head-end 102 may send the metadata request 146 to the program metadata server 110. The program metadata server 110 may perform a query of the program content metadata based on the search criteria provided in the metadata request 146. The program content metadata retrieved from the query that is performed by the program metadata server 110 may be returned to the central video head-end 102 in the request results 148. The request results 148 may then be sent to the media 180 that sent the metadata request 146.

The program content metadata may include complimentary content metadata, such as metadata associated with content of programs that are retrieved from a third-party service provider. The program content metadata may include descriptive metadata, such as a title, an author, a subject, a keyword, or other types of descriptive information that identifies a particular program or content of the particular program.

For example, the complimentary content metadata may include, but is not limited to, one or more of cast members information (e.g., birthplace, residence, universities/schools attended, education, training, and/or hometown), one or more of crew member information (e.g., birthplace, residence, universities/schools attended, education, training, and/or hometown), a production location, a filming location, actor information, actress information, director information, production timelines, production cost or budget, other information descriptive of the making or the media content or parties involved with the making of the media content, or a combination thereof. In another example, the complimentary content metadata may include, but is not limited to, channel information, a channel identifier, broadcast information, production information, other information associated with the distribution of the media content, or a combination thereof. In another example, the complimentary content metadata for a particular sports-related program may include, but is not limited to, one or more of sports team information, sports league information, sports conference information, sporting venue information, head coach information, player information, match information, scheduling information, announcer information, venue information, or a combination thereof. In another example, the complimentary content metadata may include, but is not limited to, information associated with music-related events, such as band information, singer information, songwriter information, entertainment venue information, tour name information, producer information, song information, or a combination thereof. In another example, the complimentary content metadata may include, but is not limited to, episode genre, category of programming, topic, and program type (e.g., talk show, live event, national broadcast, or local event).

The program metadata server 110 may be physically located at the central video head-end 102 or at one or more physical locations that may be distinct from a location of the central video head-end 102. For example, the program metadata server 110 may reside at an external location associated with one or more third-parties (e.g., parties other than a service provider of the system 100 and the user) that may provide the central video head-end 102 with access to at least a part of the program content metadata.

The program content metadata may be updated regularly and such updates may be performed or received automatically by actions of an operator of the program metadata server 110. The program metadata server 110 may provide the central video head-end 102 access to or information associated with the EPG. The program metadata server 110 may provide the program content metadata at least in part from information associated with the EPG.

The storage device 112 may provide storage for the central video head-end 102 including storage for the one or more components 104, 106, 108, 110 of the central video head-end 102. In a particular embodiment, the storage device 112 may store all of or portions of the criteria 142 received by the central video head-end 102. In another particular embodiment, recordings that are produced by the central video head-end 102 may be stored at the storage device 112. For example, the recordings that are produced by the central video head-end 102 may include programs that are recorded according to an automatic schedule of recordings that is defined based on the search criteria and the storage criteria of the criteria 142 provided by a user.

The central video head-end 102 may be communicatively connected to the network 120 via a network communication connection 114. The network communication connection 114 may include a wired connection, an optical fiber connection, a wireless connection, other data connection, or a combination thereof. The network communication connection 114 may support data communication via the network 120 with one or more components that may be communicatively connected to the network 120. The one or more components may include the central video head-end 102, the Internet communication server 122, the syndication feed server 124, the regional video distribution system 130, or a combination thereof. The network 120 may include one or more other networks. The network 120 can be a public network, a private network, or both. In a particular embodiment, the network 120 may be an internet protocol television (IPTV) distribution network.

The syndication feed server 124 may be communicatively coupled to the network 120 via a network communication connection 128. The network communication connection 128 may include a wired connection, an optical fiber connection, a wireless connection, other data connection, or a combination thereof. The syndication feed server 124 may receive one or more syndication feeds from one or more syndication feed providers. The syndication feed server 124 may include one or more computing devices that may be associated with a storage device. The one more syndication feed servers may be located at a remote site that is distinct from the central video head-end 102, the regional video distribution system 130, the networks 120, 140, the one or more devices 150, 160, 170, 180, the media recording device, 186, the base station 162, or a combination thereof.

The Internet communication server 122 may be communicatively coupled to the network 120 via a network communication connection 126. The network communication connection 126 may include a wired connection, an optical fiber connection, a wireless connection, other data connection, or a combination thereof. The Internet communication server 122 may enable the central video head-end 102 and the one or more components 104, 106, 108, 110 of the central video head-end 102 to perform Internet-based communications. The Internet communication server 122 may include one or more computing devices that may be associated with a storage device. One or more of the applications provided by the application server 104 may be web-based applications that can be provided, via the Internet communication server 122, to the one or more devices 150, 160, 170 that have Internet connectivity. The Internet-related communications supported by the Internet communication server 122 may include email communication, instant messaging communication, or a combination thereof.

In a particular embodiment, the Internet communication server 122 may enable one of more of the devices 150, 160, 170 or a component of the central video head-end 102 to access a syndication feed, such as a really simple syndication (RSS) feed. A particular syndication feed may provide content associated with or related to a particular syndication feed provider of the one or more syndication feed providers. The content of the particular syndication feed may include updated content, new content, or both that may be sent regularly (e.g., periodically or occasionally) via the particular syndication feed. In a particular embodiment, the syndication feed server 124 may periodically provide the particular syndication feed to the central video head-end 102. In another particular embodiment, the central video head-end 102 may cause a request to be sent to the syndication feed server 124 for the particular syndication feed.

In a particular embodiment, the particular syndication feed provider may include, with the particular syndication feed, search criteria related to one or more interests associated with the particular syndication feed provider. For example, a syndication feed provider may be a sports team fan group that shares news related to the sports team. The sports team fan group may provide, via a syndication feed, search criteria identifying schedule information related to scheduled games that fans of the sports team may be interested in. For instance, when the sports team acquires a new player that may be scheduled to play on a particular day, the sports team fan group may indicate, via the syndication feed, search criteria identifying schedule information of games scheduled after a specific date when the new player may be in a starting line-up. In another example, a syndication feed provider may be a movie actor fan group that discusses movies associated with a movie actor. When a scheduled movie starring the movie actor has been scheduled to be distributed as an on-demand program, the movie actor fan group may send a syndication feed that identifies search criteria indicating when the name and the availability of the scheduled movie starring the actor.

The regional video distribution system 130 may enable distribution of the media content and the one or more applications from the central video head-end 102 to the one or more devices 150, 160, 170, 180 associated with the user. The region video distribution system 130 may be communicatively connected to the network 120 via the network communication connection 136 and may be communicatively connected to the network 140 via a network communication connection 134. The regional video distribution system 130 may communicate with the one or more devices 150, 160, 170, 180 via the network 140. The regional video distribution system 130 may include a channel content cache server 132. The network communication connections 134, 136 may include a wired connection, an optical fiber connection, a wireless connection, other data connection, or a combination thereof.

The network 140 may enable data communication between the one or more components 130, 150, 160, 162, 170, 180 communicatively connected to the network 140. The network 140 may include one or more other networks and may be a public network, a private network, or both. In a particular embodiment, the network 140 may be an internet protocol network, such as an IPTV distribution network. The network 140 may include or may be in communication with a base station 162 that enables communication with the network 140. The base station 162 may be communicatively connected to the network 140, via data communication connection 164. The data communication connection 164 may include a wired connection, an optical fiber connection, a wireless connection, other data connection, or any combination thereof.

The one or more devices 150, 160, 170, 180 may support data communication, via the network 140. The communication device 150 may be, but is not limited to, a mobile phone and/or a device with mobile data communication capabilities. The mobile computing device 160 may be, but is not limited to, a smart phone, a personal digital assistant, a tablet computing device, and/or a mobile personal computer. The communication device 150 and the mobile computing device 160 may communicate with the base station 162 to facilitate a wireless data communication 152, 154 with the network 140 according to one or more of wireless mobile data communication compliant standards supported by the network 140. The network 140 may support one or more wireless mobile data communication compliant standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, or a combination thereof.

The computing device 170 may be, but is not limited to, a personal computer, a terminal, and/or a laptop computer. The computing device 170 may be communicatively coupled to the network 140 via a data communication connection 172. The media device 180 may be, but is not limited to, a personal digital assistant, a tablet computing device, a mobile personal computer, a personal computer, and/or a set-top box (STB). The media device 180 may be communicatively coupled to the network 140 via a data communication connection 174. The media device 180 may include a processor 182 and a memory 184. The memory 184 may include instructions that are executable by the processor 182 to cause the processor 182 to perform, at the media device 180, one or more methods described herein. The data communication connections 164, 172, 174 may include wired connections, optical fiber connections, wireless connections, other data connections, or a combination thereof. The media device 180 may store, in the memory 184, at least a part of the criteria 142 that has been specified by the user through the one or more devices 150, 160, 170, 180. The media device 180 may provide the part of the criteria 142 that is stored to the one or more devices 150, 160, 170, 180 to enable the user to define new search criteria of the criteria 142 based on the part of the criteria 142 that is stored. The media recording device 186 may manage and operate recordings of the one or more programs that may be scheduled for recording. The media recording device 186 may be, but is not limited to, a tablet computing device, a mobile personal computer, a personal computer, a digital video recorder (DVR), a personal video recorder (PVR), and/or a STB.

In operation, the user may provide the criteria 142, such as search criteria and storage criteria, through one of the devices 150, 160, 170, 180. The user may specify the criteria 142 through one of a plurality of mechanisms, but the user is not limited to these mechanisms. One mechanism may include a short messaging system (SMS) message, where at least a part of the criteria 142 are entered as text in the SMS message. Another mechanism may include an interface provided by the one or more devices 150, 160, 170, 180, where the interface enables the user to select one or more options for specifying the criteria 142 such as the search criteria and the storage criteria. The criteria 142 may be sent to the media device 180 or to the central video head-end 102 to automatically schedule one or more programs that satisfy the search criteria and the storage criteria of the criteria 142. The media device 180, after receiving the criteria 142 from the one or more devices 150, 160, 170, may send the search criteria, the storage criteria, or both of the criteria 142 to the central video head-end 102. One or more applications may be provided by the application server 104 to the one or more devices 150, 160, 170, 180 to enable the user to provide the criteria 142.

In a particular embodiment, the media device 180 may perform a search of program content metadata, accessible through the program metadata server 110, using the search criteria and the storage criteria of the criteria 142 to determine programs that satisfy each of the search criteria and the storage criteria. In another particular embodiment, the criteria 142 that includes search criteria and storage criteria are received by the central video head-end 102, where the search of the program content metadata is performed. In another particular embodiment, the storage criteria may be received as the criteria 142 from the one or more devices 150, 160, 170, 180 and the search criteria may be automatically generated based on information obtained from a social network account associated with the user. The media device 180 or the central video head-end 102 may automatically generate the search criteria. The user may provide access information to a social network account through the one or more devices 150, 160, 170, 180. The information from the social network account may be obtained by the central video head-end 102 by accessing the social network account via the Internet communication server 122 through the network 120. In a particular embodiment, the information obtained from the social network account may include a recommendation, a comment, a review, a rating, or a combination thereof, that may be provided based on one or more inputs of a device associated with the user. For example, a rating obtained from the social network account may be a score value for a particular program that is selected using the device. A recommendation may be for particular media content, such as a music video, where the recommendation describes positive and negative views about the music video. A comment may be associated with a particular actor in a particular film, where the comment describes opinions or thoughts about the particular actor. A review may be associated with a particular sporting event, where the review is a description summarizing highlights of the sporting event. In another particular embodiment, the information obtained from the social network account may include one or more inputs that are provided by one or more users of a social network that are connected to the social network account. The one or more inputs may include a recommendation, a comment, a review, a rating, or a combination thereof. The information obtained from the social network account, which may be based on input of the user or input of the one or more users of the social network connected to the social network account, is not limited to categories identified above (e.g., a recommendation, a comment, a review, a rating). The information may include any information stored, tracked, or maintained for the social network account that may be accessed by a third party.

Based on the search criteria specified in the criteria 142 provided by the user or automatically generated within the system 100, a search is performed of the program content metadata for one or more programs associated with the search criteria. In a particular embodiment, the central video head-end 102 may send a metadata request 144 to the program metadata server 110 to perform a query of the program content metadata based on the search criteria of the criteria 142. Based on the query, the program content metadata server 110 may send the request results 148, including the results of the query that may identify one or more particular programs based on the search criteria, to the central video head-end 102.

In another particular embodiment in which the media device 180 handles automatically scheduling recording of programs based on the search criteria, the media device 180 may identify programs that satisfy the search criteria of the criteria 142 sent by the user. To identify programs that satisfy the search criteria, the media device 180 may send the metadata request 146 to the central video head-end 102, which in turns sends the metadata search request 146 to the program metadata server 110 to query the program content metadata based on the search criteria. The program metadata server 110 may send, to the central video head-end 102, the request results 148 that are produced based on a query at the program metadata server 110 of the search criteria. The request results 148 may indicate the one or more programs that satisfy one or more of the search criteria. The one or more programs may be programs that are available from the one or more video sources accessible to the central video head-end 102, such as the on-demand media content server 108 or the channel content server 106. The request results 148 may be may be sent to the media device 180 that sent the metadata request 146. In another particular embodiment, the media device 180 may request the program content metadata by sending the metadata request 146 to the central video head-end 102. The media device 180 may perform a search of the program content metadata returned to the media device 180 in the request results 148 to identify the one or more particular programs. The search of the program content metadata may be based on the search criteria received by the media device 180. The program content metadata that is received in the request results 148 may be in a flat file format. The media device 180 may perform a search of the program content metadata by a character string search that is defined based on the one or more of the search criteria.

In a particular embodiment, the central video head-end 102 may store recordings, at the storage device 112, of the one or more particular programs that are automatically scheduled for recording. In another particular embodiment the media device 180 may store the recordings of the one or more particular programs in the memory 184 of the media device 180. In another particular embodiment, the media recording device 186 may perform at least in part operation and management of the one or more particular programs automatically scheduled for recording. The automatically scheduled recordings may be stored at the media device 180, the media recording device 186, or the central video head-end 102, where a determination may be made as to whether the one or more particular recordings that satisfy the search criteria of the criteria 142 also satisfy the storage criteria of the criteria 142 if the one or more particular programs were recorded.

In response to determining that the storage criteria would not be satisfied if the one or more of the particular programs were recorded at the central video head-end 102 (e.g., when recording the one or more particular programs would significantly reduce available memory capacity), the central video head-end 102 may send a notification to the one or more devices 150, 160, 170, 180 associated with the user to indicate that the storage criteria of the criteria 142 is not satisfied if the one or more particular programs were recorded. For example, the notification may be sent to the user as a message that appears in the one or more applications provided to the one or more devices 150, 160, 170, 180. In another example, the notification may be an SMS message that is sent to the communication device 150, the mobile computing device 160, or a combination thereof. In another example, the notification may be sent as an Internet communication (e.g., an email or instant message) via the Internet communication server 122 to the one or more devices 150, 160, 170, 180 that may have Internet communication capabilities. In another embodiment, in response to determining that the storage criteria would not be satisfied if the one or more of the particular programs were recorded at the media device 180, the media device 180 may send the notification to the communication device 150, the mobile computing device 160, the computing device 170, or a combination thereof to indicate that the storage criteria is not satisfied if the one or more particular programs were recorded at the media device 180. Alternatively, the media device 180 may send the notification to the display device 190 operatively connected to the media device 180.

In a particular embodiment where the central video head-end 102 determines that the storage criteria of the criteria 142 would be satisfied if the one or more of the particular programs were recorded at the central video head-end 102, the central video head-end 102 may automatically schedule recordings of the one or more particular programs. In another particular embodiment where the media device 180 determines that the storage criteria would be satisfied if the one or more of the particular programs were recorded at the media device 180, the media device 180 may automatically schedule recordings of the one or more particular programs. Based on where the recordings are automatically scheduled (e.g., at the central video head-end 102 or the media device 180), the central video head-end 102 or the media device 180 may automatically produce the recordings of the one or more particular programs when the one or more particular programs are broadcasted.

In a particular embodiment, when the central video head-end 102 determines that the storage criteria would not be satisfied if the one or more of the particular programs were recorded at the central video head-end 102, the central video head-end 102 may send a message to the one or more devices 150, 160, 170, 180 associated with the user that includes an option to record at least a part of the one or more of the particular programs at a remote storage device (e.g. a network DVR not shown). The remote storage device may be communicatively coupled to the one or more devices 150, 160, 170, 180 via a data communication connection. For example, the remote storage device may be, but is not limited to, a DVR, a PVR, a STB with video recording capabilities, any other computing device that is able to manage and operate recordings of media content, (e.g., the one or more particular programs) or a combination thereof. The data communication connection between the remote storage device and the one or more devices 150, 160, 170, 180 may include a wired connection, an optical fiber connection, a wireless connection, other data connection, or any combination thereof. The remote storage device may be located remotely from the one or more devices 150, 160, 170, 180 and may be operated and/or managed by a service provider of the system 100. In a particular embodiment, the service provider of the system may associate an additional charge to manage and operate recordings of the one or more particular programs at the remote storage device. In another particular embodiment, the message that includes the option to record the one or more of the particular programs at the remote storage device may also include information indicating that an additional charge may be associated with managing and operating the recordings at the remote storage device.

The user may choose to record the one or more of the particular programs at the remote storage device by selecting the option that is included with the message. For example, the message that includes the option may appear in the one or more applications provided to the one or more devices 150, 160, 170, 180, where the one or more applications provide a mechanism to select the option to indicate whether the user chooses to have the one or more of the particular programs recorded at the remote storage device. In another example, the message may be an SMS message that is sent to the communication device 150, the mobile computing device 160, or a combination thereof. The SMS message may indicate a manner in which the user may respond to the SMS message to indicate whether the user chooses to have the one or more of the particular programs recorded at the remote storage device. In another example, the message may be sent as an Internet communication (e.g., an email or instant message) via the Internet communication server 122 to the one or more devices 150, 160, 170, 180 that may have Internet communication capabilities. The Internet communication may indicate a manner in which the user may respond to the Internet communication to indicate whether the user chooses to have the one or more of the particular programs recorded at the remote storage device. Once the user has selected the option that is included in the message, the central video head-end 102 may automatically schedule recordings of the one or more particular programs at the remote storage device based on when the one or more particular programs are broadcasted.

Thus, the system 100 of FIG. 1 may enable the user to automatically schedule recordings of programs from the one or more devices 150, 160, 170, 180. The ability for the user to automatically schedule recordings by providing the criteria 142 including the search and storage criteria from a communication device 150 or a mobile computing device 160 affords the user with flexibility to schedule recordings when the user may not have access to a media device. Automatically scheduling recording of programs based on search criteria can reduce an amount of time that the user has to spend to periodically perform searches for media content based on a particular interest. Additionally, specifying the storage criteria may ensure that an excessive amount of automatically scheduled recordings are not produced, such that storage may be operated and managed efficiently.

Figure 2:
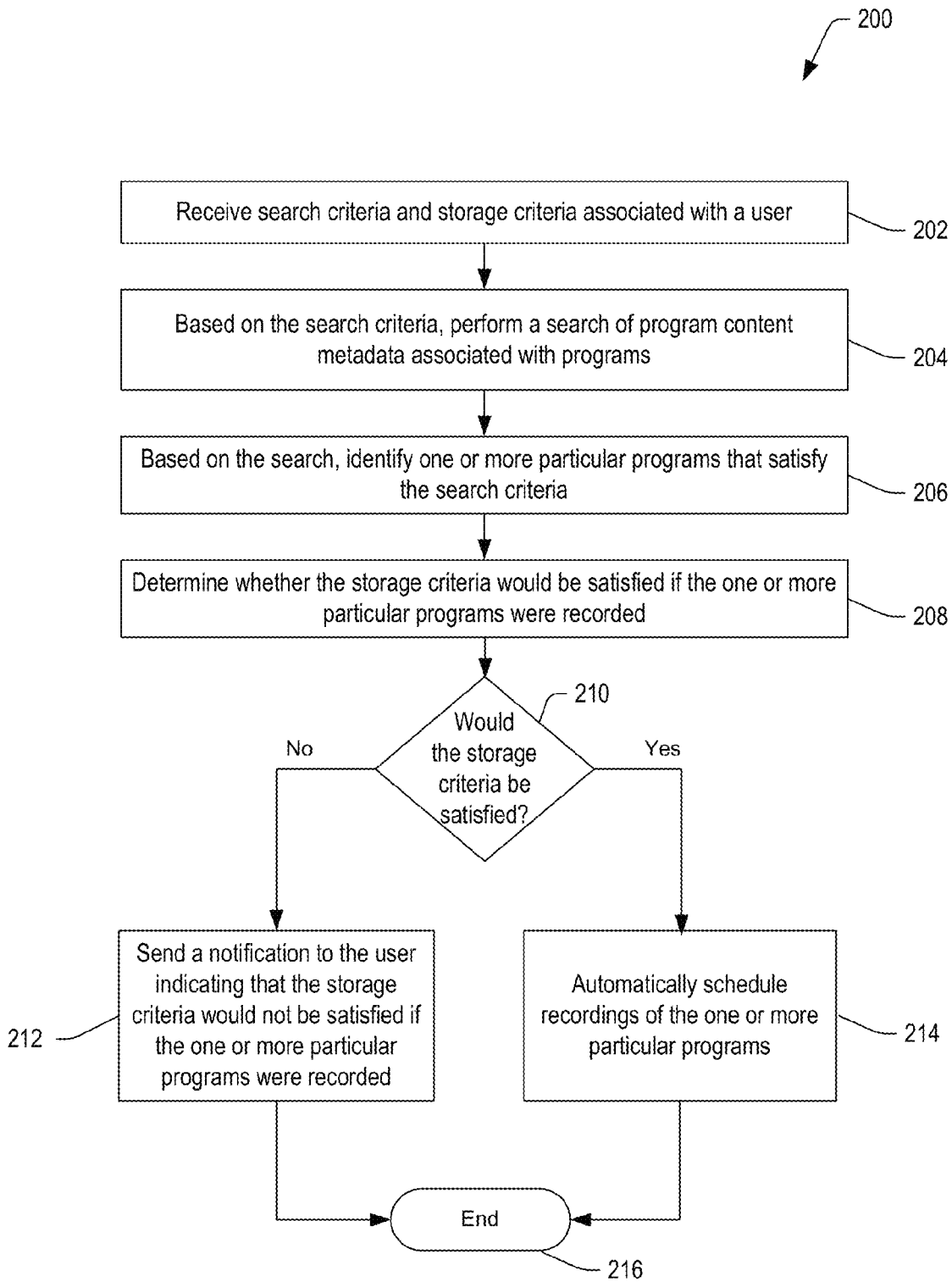
FIG. 2 is a flow chart of a first embodiment of a method to automatically record programs based on search criteria.

Referring to FIG. 2, a first embodiment of a method 200 to automatically recording programs based on search criteria is shown. The method 200 may be performed by the system 100 in FIG. 1. At 202, the method includes receiving search criteria and storage criteria associated with a user. In one example, in FIG. 1, the media device 180 may receive the criteria 142 including search criteria and the storage criteria, via the network 140, from one or more devices 150, 160, 170 associated with the user. The search criteria may be based at least in part on the complimentary content metadata (such as cast members information, crew information, a production location, actor information, actress information, director information, production timelines, production cost or budget, other information descriptive of the making or the media content or parties involved with the making of the media content, channel information, a channel identifier, broadcast information, production information, other information associated with the distribution of the media content, or sports-related program information such as sports team information, sports league information, sports conference information, sporting venue information, head coach information, player information, match information, scheduling information, announcer information, venue information, or music-related event information such as band information, singer information, songwriter information, entertainment venue information, tour name information, producer information, song information, or a combination thereof). The search criteria may include program series information that includes program subscription options such as a type of episode (e.g., new or old) and a series subscription. The search criteria may include general program information such as episode genre, category of programming, topic of programming, and program type. In a particular embodiment the search criteria may include a recording date, such that recordings that are automatically scheduled occur before the recording date. In another particular embodiment, the storage criteria may include a number of recordings to be recorded, such that a number of recordings that are automatically scheduled should not exceed the number of recordings to be recorded. In another particular embodiment, the storage criteria may include a storage date, such that recordings of the one or more particular programs that are to be stored should be stored on or before the storage date.

At 204, the method further includes performing a search, based on the search criteria, of program content metadata associated with programs. For example, in FIG. 1, the media device, based on the search criteria of the criteria 142, may perform a search of the program content metadata associated with programs accessible to the media device 180 via the central video head-end 102. Alternatively, the media device 180 may perform a search of the program content metadata associated with the programs by sending a request to the central video head-end 102 to perform the search of the program content metadata on behalf of the media device 180. In a particular circumstance, the search criteria may be associated with unrelated programs or may not be a combination that identifies a particular program. For example, the search criteria may include criteria that specify a sports team and movies directed by a movie director, a combination that may not exist. Thus, performing a search of the program content metadata may locate a set of programs that may be more relevant to the user's interests when the search of the program content metadata is performed based at least in part on the search criteria. In another embodiment, searching for the programs based on the search criteria may include searching based at least in part on the search criteria that may be related to a particular category (e.g., sports, music, or movies) of programming. In another embodiment, searching for the programs based on the search criteria may include searching for the programs based on one criterion of the search criteria.

At 206, the method further includes identifying, based on the search performed at 204, one or more particular programs that satisfy the search criteria. In one example, in FIG. 1, the media device 180 may identify, based on the search performed of the search criteria of the criteria 142, one or more particular programs that satisfy the search criteria. In a particular embodiment, identifying the one or more particular programs that satisfy the search criteria may include determining whether a program that is located based on the search, at 204, is related to a particular category (e.g., movies, sports, music) that is identified in the search criteria and that satisfies at least one other criterion of the search criteria. In another embodiment, where the search criteria includes a record date, determining whether the one or more programs satisfy the search criteria may include determining whether the one or more programs would be broadcast before the record date.

At 208, the method includes determining whether the storage criteria would be satisfied if the one or more particular programs were recorded. For example, in FIG. 1, the media device 180 may determine whether the storage criteria of the criteria 142 would be satisfied if the one or more particular programs were recorded by the media device 180. In a particular embodiment where the storage criteria includes a number of recordings to be recorded, the media device 180 may determine whether the storage criteria is satisfied based on whether the number of recordings of the one or more particular programs at the media device 180 exceeds the number of the recordings to be recorded. In another particular embodiment where the storage criteria indicates the storage date, the media device 180 may determine that the storage criteria is satisfied when each of the recordings that would be scheduled to be recorded would be stored before the storage date.

When the storage criteria would not be satisfied, at 210, the method proceeds to 212. When the storage criteria would be satisfied, at 210, then the method proceeds to 214.

At 212, the method includes sending a notification to the user indicating that the storage criteria would not be satisfied if the one or more particular programs were recorded. For example, in FIG. 1, in response to determining that the storage criteria of the criteria 142 would not be satisfied, the media device 180 may send a notification to the one or more devices 150, 160, 170, 180 associated with the user. The notification may indicate to the user that the storage criteria provided by the user would not be satisfied if the one or more particular programs were recorded. In a particular embodiment, the notification may be an alert message that is displayed to the user in the one or more applications provided to the one or more devices 150, 160, 170, 180. In another particular embodiment, the notification may be an SMS message that is sent to one or more devices that supports SMS service, such as the communication device 150 and the mobile computing device 160, where the SMS message indicates that the storage criteria would not be satisfied. The method ends at 216.

At 214, the method includes automatically scheduling recordings of the one or more particular programs. For example, in FIG. 1, in response to determining that the storage criteria of the criteria 142 would be satisfied, the media device 180 may automatically schedule recordings of the one or more particular programs. Automatically scheduling the recordings may include indicating in the memory 184 of the media device 180 that a particular portion of the storage is reserved for the automatically scheduled recordings of the one or more particular programs that are identified. For example, the media device 180 may include a scheduling table that is maintained within the memory 184, such that the scheduling table identifies an amount of the memory 184 and scheduling information associated with the one or more particular programs. The method ends at 216.

Figure 3:
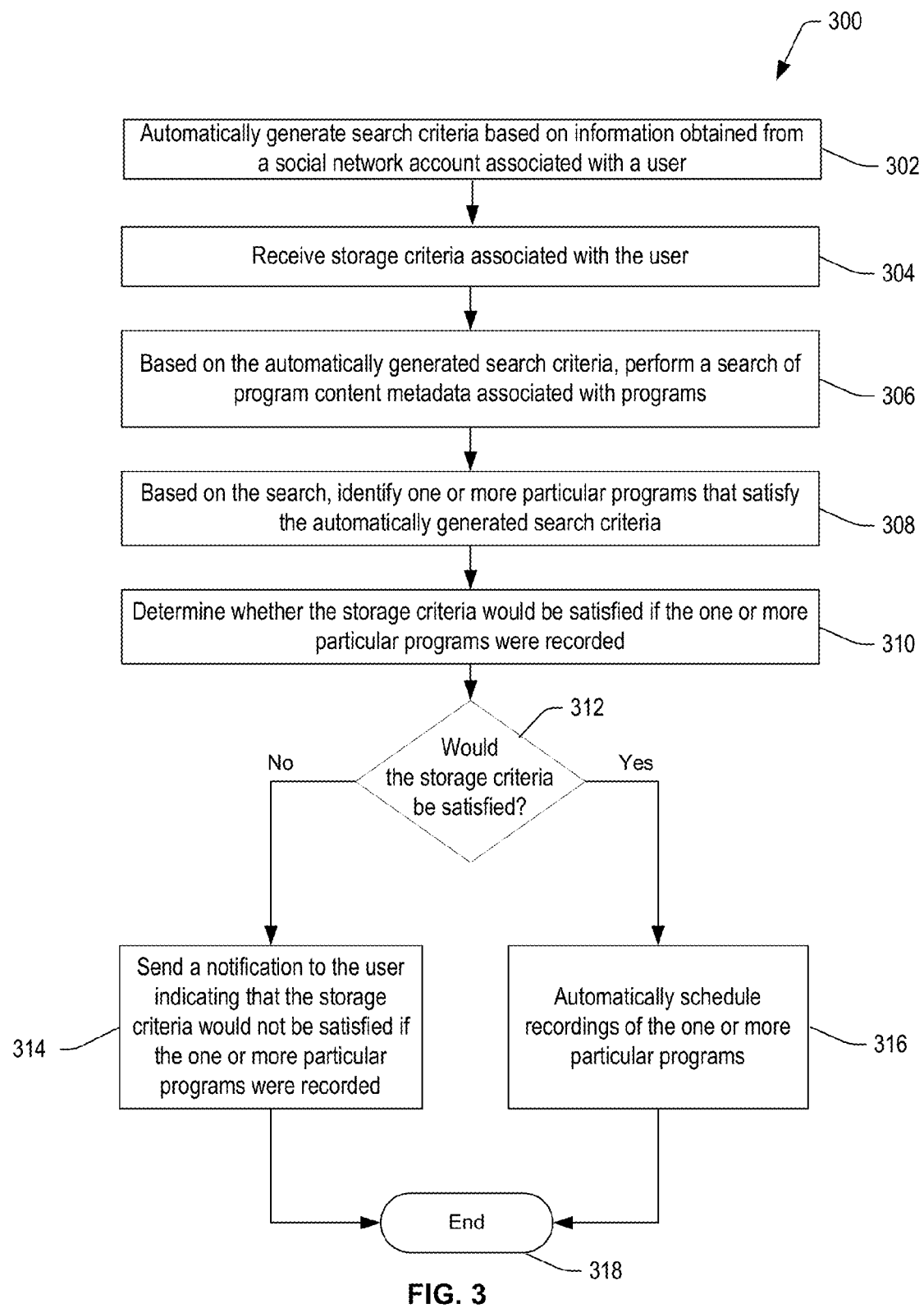
FIG. 3 is a flow chart of a second embodiment of a method to automatically record programs based on search criteria.

Referring to FIG. 3, a second embodiment of a method 300 to automatically record programs based on search criteria is shown. The method 300 may be performed by the system 100 in FIG. 1.

At 302, the method includes automatically generating search criteria based on information obtained from a social network account associated with the user. For example, the media device 180 of the central video head-end 102 of FIG. 1 may automatically generate the search criteria using information obtained from a social network account associated with the user. To illustrate, the central video head-end 102 may access the social network account, via the Internet communication server 122, to obtain information, such as interest information, associated with the user. In a particular embodiment, the interest information may include input provided by the one or more devices 150, 160, 170, 180. The input may relate to or identify the user's interests. The input may include, but is not limited to, one or more of a recommendation, a comment, a review, a rating, or a combination thereof related to media content. In a particular embodiment, the interest information may include one or more interest groups (e.g., a musical band fan group or an actor/actress fan group) that may be based on network connections or group associations associated with the social network account. In another embodiment, the one or more interest groups may be identified based on a particular group to which the user provided the input. In another embodiment, the interest information may include preferences associated with the social network account, such as like/dislike information, favorite information, or links to particular topics of interest. The interest information may include media content that may have been recently accessed by the user. For example, the interest information may indicate that the user has viewed videos of a particular musical band several times. In another embodiment, the interest information may include one or more inputs that are provided by one or more users of a social network that maintains the user's social network account. The one or more inputs provided by the one or more users may include, but is not limited to, a recommendation, a comment, a review, a rating, or a combination thereof. For example, the interest information may indicate that one or more friends, connected to the user's social network account, may have recommended a particular television series program to the user and may have sent to the user's social network account, one or more of positive comments, positive ratings, positive recommendations, or a combination thereof for the particular television series program. In a particular embodiment, the automatically generated search criteria may be based on the one or more interest groups to which the user's social network account is connected. The automatically generated criteria may include one or more programs on which the user, the user's friends, or both have provided input.

At 304, the method includes receiving storage criteria associated with a user. For example, in FIG. 1, the media device 180 or the central video head-end 102 may receive storage criteria of the criteria 142 from the one or more devices 150, 160, 170, 180 associated with the user. In another example, in FIG. 1, the central video head-end 102 may receive storage criteria of the criteria 142 from one or more of the applications provided to one or more devices 150, 160, 170, 180 associated with the user. In a particular embodiment, the storage criteria may include a program recording length that indicates that a length of time (e.g., three hours) that each recording that is automatically scheduled is not to exceed. In another particular embodiment, the storage criteria may include a series program limit that indicates a number of programs of a series that may be automatically scheduled for recording at during a particular time period. In another particular embodiment, the storage criteria may indicate a total amount of memory that can be used for automatically scheduled recordings.

At 306, the method further includes performing a search, based on the automatically generated search criteria, of program content metadata associated with programs. For example, in FIG. 1, the media device 180 or the central video head-end 102 may perform a search of program content metadata associated with the programs accessible by the central video head-end 102 based on the automatically generated search criteria. In a particular embodiment, the central video head-end 102 may send the search request 144 to the program metadata server 110 to search the program content metadata to locate the programs that satisfy one criterion of the automatically generated criteria. In another particular embodiment, the central video head-end 102 may send the search request 144 to the program metadata server 110 to search the program content metadata to locate the programs that are associated with an interest group (e.g., music fan group or a sports team fan group) specified in the automatically generated criteria.

At 308, the method further includes identifying, based on the search performed at 306, one or more particular programs that satisfy the automatically generated search criteria. The one or more particular programs may be one or more of the programs associated with the program content metadata. For example, in FIG. 1, the central video head-end 102 may identify one or more particular programs from the programs that are located based on the search criteria of the criteria 142. In a particular embodiment, the central video head-end 102 may identify the one or more particular programs based on a particular sports team specified in the automatically generated search criteria that indicates the user likes the particular sports team and/or has watched recent games of the particular sports team. In another particular embodiment, the central video head-end 102 may identify the one or more particular programs that associated with a particular production location and/or a particular actor based on the automatically generated search criteria that indicate that the user has interest in movies that are produced at the production location and/or that have the particular actor.

At 310, the method includes determining whether the storage criteria would be satisfied if the one or more particular programs were recorded. For example, in FIG. 1, the media device 180 or the central video head-end 102 may determine whether the storage criteria of the criteria 142 would be satisfied if the one or more particular programs were automatically scheduled to be recorded. In a particular embodiment, the central video head-end 102 may determine whether the storage criteria of the criteria 142 would be satisfied if the one or more particular programs that would be scheduled to be automatically recorded would not exceed a particular number of sports-related events, where the number of sports-related events is a criterion of the storage criteria.

At 312, when the storage criteria would not be satisfied if the one or more particular programs were recorded, the method proceeds to 314. When the storage criteria would be satisfied if the one or more particular programs were recorded, at 312, the method proceeds to 316.

At 314, the method includes sending a notification to the user indicating that the storage criteria would not be satisfied if the one or more particular programs were recorded. In a particular embodiment, in FIG. 1, the notification can be a message that is sent to the one or more devices 150, 160, 170, 180 associated with the user. The message may indicate that the storage criteria of the criteria 142 would not be satisfied if the one or more particular programs were scheduled to be recorded by the central video head-end 102. In a particular embodiment, the notification may be sent to the media device 180 to be displayed at the display device 190. The notification may be displayed as an alert dialog that is displayed on a portion of a screen of the display device 190. The method ends at 318.

At 316, the method includes automatically scheduling recordings of the one or more particular programs. For example, in FIG. 1, the media device 180 or the central video head-end 102, in response to determining that the storage criteria of the criteria 142 would be satisfied, may automatically schedule recordings of the one or more particular programs. Automatically scheduling the recordings may include specifying to the storage device 112 that a particular portion of the storage is reserved for the automatically scheduled recordings. In a particular embodiment, the central video head-end 102 may access the EPG from the application server 104 to obtain scheduling information for the one or more particular programs that are scheduled to be recorded. Based on the scheduling information, the central video head-end 102 may maintain a scheduling table that identifies the one or more particular programs scheduled for recording. The scheduling information may be used by the central video head-end 102 to determine an amount of storage for recording the one or more particular programs at the storage device 112. The method ends at 318.

Figure 4:
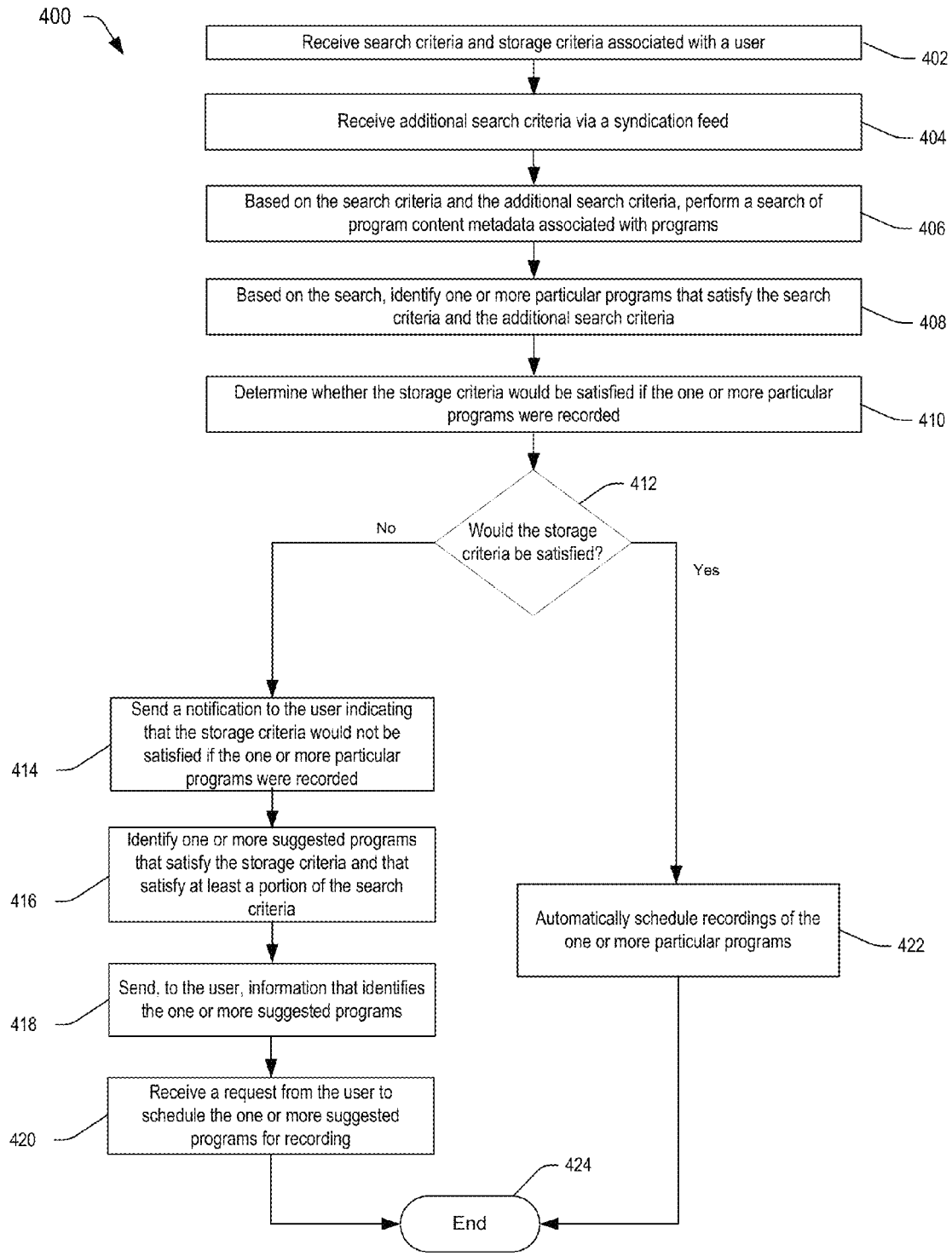
FIG. 4 is a flow chart of a third embodiment of a method to automatically record programs based on search criteria.

Referring to FIG. 4, a third embodiment of a method 400 to automatically record programs based on search criteria is shown. The method 400 may be performed by the system 100 in FIG. 1.

At 402, the method includes receiving search criteria and storage criteria associated with a user. For example, in FIG. 1, the media device 180 or the central video head-end 102 may receive the search criteria of the criteria 142 from the one or more devices 150, 160, 170, 180. In a particular embodiment, the search criteria, the storage criteria, or both may be part of the criteria 142 that is received as described above with respect to 202 in FIG. 2, with respect to 304 in FIG. 3, or both.

At 404, the method includes receiving additional search criteria via a syndication feed associated with one or more interest groups identified in the search criteria. For example, in FIG. 1, the central video head-end 102 or the media device 180 may receive additional search criteria via a particular syndication feed associated with one or more interest groups identified in the search criteria of the criteria 142. The one or more interest groups identified in the search criteria may be used to identify a particular syndication feed provider that distributes the particular syndication feed. In a particular embodiment, the syndication feed server 124 may determine the particular syndication feed provider by searching the Internet for one or more syndication feed providers that may be related at least in part to the one or more interest groups. In a particular embodiment, the central video head-end 102 may communicate, via the network 120, with the syndication feed server 124 to receive the particular syndication feed associated with the one or more interest groups identified in the search criteria. In another embodiment, the media device 180 may communicate, via the network 140, with the region video distribution system 130 to receive the particular syndication feed from the syndication feed server 124.

In a particular embodiment, the search criteria may identify one or more specific groups (e.g., interest groups). For example, the search criteria may include a list of names of groups that provide syndication feeds, such as news groups, sports fan clubs, movie fan clubs, musical band fan clubs, or a combination thereof. In another particular embodiment, the search criteria may identify interest groups as a particular category of media and particular interests related to that particular category. For example, a sports fan club associated with a sports team may be identified based on one or more criteria that indicate sporting events related to the sports team. In another example, a particular musical band fan group for a particular musical band may be identified based on one or more criteria that indicate music events, shows related to the particular musical band, concerts related to the particular musical band, or a combination thereof.

The particular syndication feed provider may provide, via the particular syndication feed, information that relates to a particular interest of the one or more interest groups. The information may indicate scheduled programs that relate to the particular interest of the particular interest group. The additional search criteria may be based on the information provided in the particular syndication feed. The information may include keywords terms related to programming of which followers of the particular interest group may be interested. For example, the particular interest group identified in the search criteria may be a particular sports fan group for a particular sports team. The particular sports fan group may provide, via a syndication feed, keywords that may include names of one or more particular players considered as favorites of fans of the particular sports fan group. The keywords may include dates of scheduled games in which the one or more particular players, considered as favorites, are expected to start. In another example, where the particular interest group may be an actress fan group associated with a particular actress, the keywords may include names of scheduled programs that may host the particular actress in an interview. In another particular embodiment, the search criteria may include a musical band fan group (e.g. Aerosmith Official fan club) that is associated with a particular music band (e.g., Aerosmith). In this embodiment, the particular syndication feed provider (e.g., the Aerosmith Official Fan Club) may be associated with the particular musical band fan group identified in the search criteria. In another example, the particular syndication feed provider associated with the particular music band fan group may provide the additional search criteria in the form of names and dates of scheduled programs when the particular music band may be appearing for a live interview.

In another particular embodiment, the particular syndication feed may be associated with one or more interest groups identified based on the information obtained from the social network account associated with the user. The central video head-end 102 or the media device 180 may access, via the Internet communication server 122, the social network account associated with the user to obtain the information from the social network account associated with the user. In a particular embodiment, the one or more interest groups may be identified based on information from the social network account that includes one or more interest groups to which the social network account is connected. In another particular embodiment, the one or more interest groups are identified based on a particular interest identified within an interests section of a profile of the social network account. The one or more interest groups may be identified based on one or more items (e.g., musical bands) listed in groups (e.g., favorite music) defined within the profile. In another particular embodiment, the one or more interest groups may be identified based on recent media content accessed from the social network account. For example, a particular interest group may be talk shows based on recent media content that was accessed, such as programs hosted by a particular TV host.

At 406, the method includes performing a search, based on the search criteria and the additional search criteria, of program content metadata associated with programs. For example, in FIG. 1, the central video head-end 102 or the media device 180, based on the search criteria of the criteria 142 and the additional search criteria, may perform a search of the program content metadata associated with the programs. In a particular embodiment, the program content metadata may be searched as described above with respect to 204. In another particular embodiment, the programs may be located based on individual searches using the search criteria and the additional search criteria. In an illustrative example, a first search may be performed using the search criteria and a second search may be performed using the additional search criteria. In another particular embodiment, the programs may be located based on a search that is performed using at least a part of the search criteria related to a particular category of programming (e.g., a movie, a program series, a music event, or a sports event) and at least a part of the additional criteria related to the particular category of programming of the search criteria.

At 408, the method further includes identifying, based on the search performed at 406, one or more particular programs that satisfy the search criteria and the additional search criteria. In a particular embodiment, the one or more particular programs may be identified based on the programs that match at least one criterion of the search criteria and of the additional search criteria. In another particular embodiment, the one or more particular programs may be identified based on the programs that satisfy each of the additional criteria and that satisfy at least one criterion of the search criteria. For example, when the additional search criteria include criteria associated with a particular film crew and a particular production location, and the search criteria include criteria associated with one or more types of programs such as movies, the one or more particular programs are identified based on programs that satisfy each of the additional criteria and that are associated with movies.

At 410, the method includes determining whether the storage criteria would be satisfied if the one or more particular programs were recorded. In a particular embodiment, determining whether the storage criteria of the criteria 142 would be satisfied if the one or more particular programs were recorded may be performed as described above with respect to 208 in FIG. 2, with respect to 310 in FIG. 3, or both.

When the storage criteria would not be satisfied, at 412, the method proceeds to 414. When the storage criteria would be satisfied, at 412, then the method proceeds to 422.

At 414, the method includes sending a notification to the user indicating that the storage criteria would not be satisfied if the one or more particular programs were recorded. In a particular embodiment, sending the notification to the user indicating that the storage criteria of the criteria 142 would not be satisfied if the one or more particular programs were recorded may be performed as described above with respect to 212 in FIG. 2, with respect to 314 in FIG. 3, or both.

At 416, the method includes identifying one or more suggested programs that satisfy the storage criteria and that satisfy at least a portion of the search criteria. For example, in FIG. 1, the central video head-end 102 or the media device 180 may determine one or more suggested programs that satisfy the storage criteria and at least a portion of the search criteria of the criteria 142. In a particular embodiment, the one or more suggested programs may be determined by adjusting the search criteria to satisfy the storage criteria. In one example, in FIG. 1, the central video head-end 102 may determine that based on a record date specified in the search criteria of the criteria 142, programs that would be automatically scheduled for recording may cause the storage device 112 to exceeds its storage capacity. In a particular embodiment, the central video head-end 102 may determine that the number of the recordings may cause the storage device 112 to exceeds its capacity because the number of the recordings that are sporting events is large based on a recording date in the search criteria that creates a large scheduling window. The central video head-end 102 may adjust the recording date to reduce the scheduling window to reduce the number of recordings to satisfy the storage criteria of the criteria 142. In another example, in FIG. 1, the central video head-end 102 may determine that the number of recordings causes the storage device 112 to exceed its capacity because the search criteria of the criteria 142 indicates old and new episodes of a particular series of programs are scheduled to be recorded. The central video head-end 102 may automatically adjust the scheduling of the recordings to satisfy the storage criteria of the criteria 142 by adjusting the search criteria to schedule only the new episodes.

At 418, the method includes sending, to the user, information that identifies the one or more suggested programs. For example, in FIG. 1, the central video head-end 102 may send to the one or more devices 150, 160, 170, 180 suggested program information that identifies one or more suggested programs that satisfy the storage criteria and at least a part of the search criteria of the criteria 142. In another example, in FIG. 1, the media device 180 may send to the one or more devices 150, 160, 170 the suggested program information that identifies the one or more suggested programs that satisfy the storage criteria and at least a part of the search criteria of the criteria 142. In a particular embodiment, the suggested program information can be a message that identifies when each of the one or more suggested programs would be scheduled to be recorded. Additionally, a request may be sent along with the suggested program information to the one or more devices 150, 160, 170, 180 inviting the user to indicate whether recordings of the one or more suggested programs should be automatically scheduled. In another particular embodiment, the suggested program information may be sent as a message that appears within an application provided to the one or more devices 150, 160, 170, 180 associated with the user. In another particular embodiment, the suggested program information may be sent as a text message (e.g., an SMS message) to the communication device 150, the mobile computing device 160, or both.

At 420, the method further includes receiving a request from the user to schedule the one or more programs suggested for recording. For example, in FIG. 1, after the suggested program information is sent to the user, the user may send a request to the central video head-end 102 or the media device 180 to schedule the one or more suggested programs. In a particular embodiment where the user receives the suggested program information in an application, the user may send the request, through the application, to schedule the one or more suggested programs. The method ends at 424.

At 422, the method includes automatically scheduling recordings of the one or more particular programs. In a particular embodiment, the one or more particular programs may be automatically scheduled for recording as described above with respect to 214 in FIG. 2, with respect to 316 in FIG. 3, or both. The method ends at 424.

Figure 5:
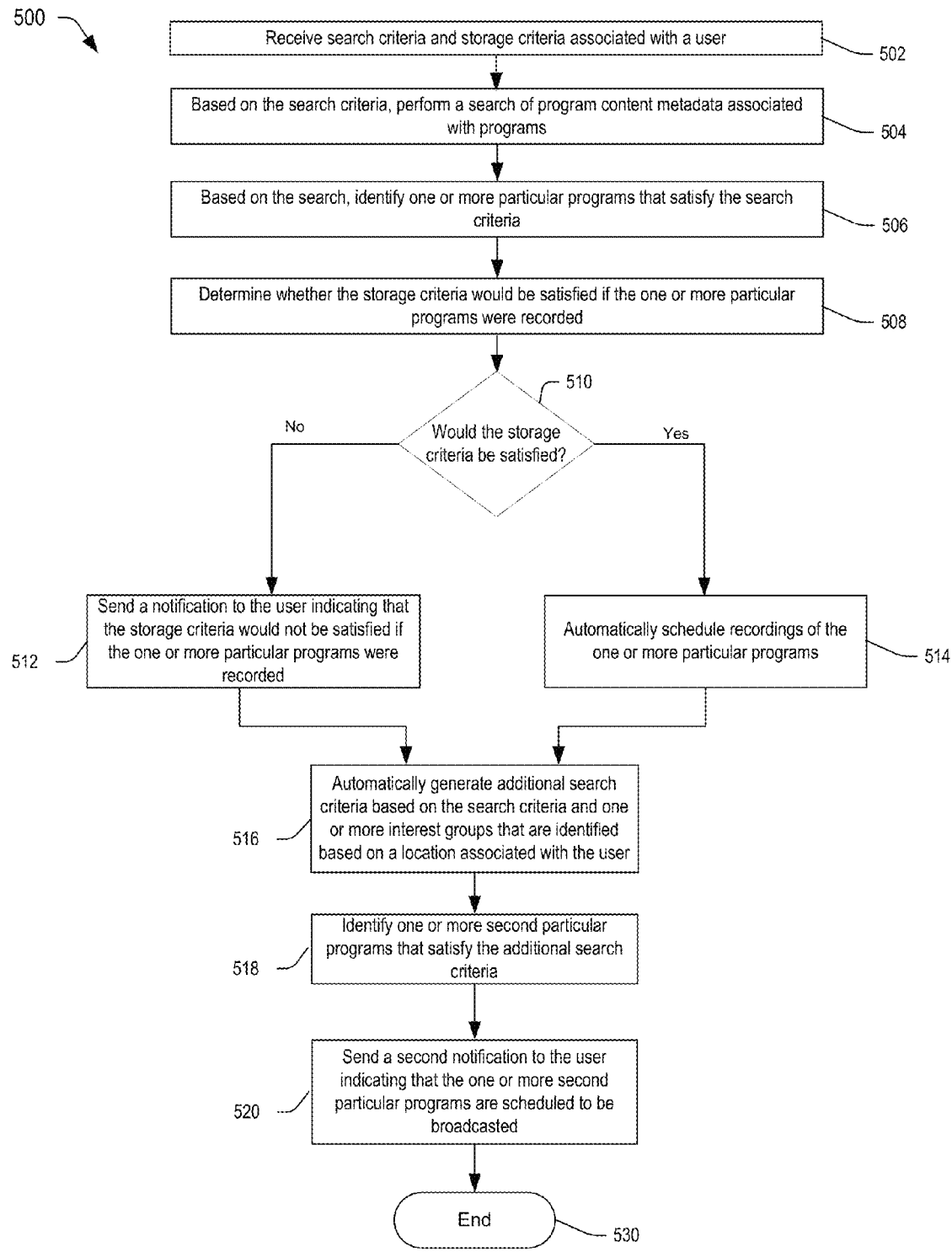
FIG. 5 is a flow chart of a fourth embodiment of a method to automatically record programs based on search criteria

Referring to FIG. 5, a fourth embodiment of a method 500 to automatically record programs based on search criteria is shown. The method 500 may be performed by the system 100 in FIG. 1.

At 502, the method includes receiving search criteria and storage criteria associated with a user. In a particular embodiment, the search criteria, the storage criteria, or both may be part of the criteria 142 that is received as described above with respect to 202 in FIG. 2, with respect to 402 in FIG. 4, or both. In another particular embodiment, the storage criteria may be part of the criteria 142 that is received as described above with respect to 304 in FIG. 3.

At 504, the method includes performing a search, based on the search criteria, of program content metadata associated with programs. In a particular embodiment, the search may be performed as described above with respect to 204 in FIG. 2.

At 506, the method includes identifying, based on the search, one or more particular programs that satisfy the search criteria. In a particular embodiment, identifying the one or more particular programs may be performed as described above with respect to 206 in FIG. 2.

At 508, the method includes determining whether the storage criteria would be satisfied if the one or more particular programs were recorded. In a particular embodiment, determining whether the storage criteria would be satisfied may be performed as described above with respect to 208 in FIG. 2.

When the storage criteria would not be satisfied, at 510, the method proceeds to 512. When the storage criteria would be satisfied, at 510, then the method proceeds to 514.

At 512, the method includes sending a notification to the user indicating that the storage criteria would not be satisfied if the one or more particular programs were recorded. In a particular embodiment, sending the notification to the user may be performed as described above with respect to 212 in FIG. 2. In another particular embodiment, sending the notification to the user may be performed as described above with respect to 314 in FIG. 3. In another particular embodiment, sending the notification to the user may be performed as described above with respect to 414 in FIG. 4.

At 514, the method includes automatically scheduling recordings of the one or more particular programs. In a particular embodiment, automatically scheduling recordings of the one or more particular programs may be performed as described above with respect to 214 in FIG. 2, with respect to 316 in FIG. 3, with respect to 422 in FIG. 4, or a combination thereof.

At 516, the method includes automatically generating additional search criteria based on the search criteria and one or more interest groups that are identified based on a location associated with the user. For example, in FIG. 1, the media device 180 or the central video head-end 102 may automatically generate additional search criteria based on the search criteria of the criteria 142 and the one or more interest groups that are identified based on a location associated with the user. The location associated with the user may be specified in the search criteria. Alternatively, the location associated with the user may be determined by the media device 180 based on a subscription account associated with the user. The location may also be determined via a global positioning system (GPS) of the one or more devices 150, 160, 170 that may send the search criteria and the storage criteria to the media device 180 or the central video head-end 102. The location may also be obtained based on a zip code specified in the search criteria. In one example, the one or more interest groups identified based on the location (e.g., Austin, Tex.) may include sports team interest groups that are determined based on one or more sports teams (e.g., Texas Rangers, Houston Astros, San Antonio Spurs) located within proximity to the location associated with the user. In another example, the one or more interest groups identified based on the location may include one or more music interest groups that are determined based on location of a music band who members are from a city or town that is within proximity to the location associated with the user. In a particular embodiment, the additional criteria may be automatically generated by combining the search criteria with the one or more interest groups based on one or more categories of programs (e.g., a sporting event, a television series, a movie, or a music event) specified in the search criteria. For example, the media device 180 or the central video head-end 102 may generate the additional search criteria by associating the one or more interest groups (e.g., Texas Rangers, San Antonio Spurs) to at least a part of the search criteria (e.g., category of programs, such as sporting events).

At 518, the method includes identifying the one or more particular programs that satisfy the additional search criteria. For example, in FIG. 1, the media device 180 or the central video head-end 102 may identify the one or more particular programs that satisfy the additional search criteria. In a particular embodiment, the one or more particular programs that satisfy the additional search criteria may be performed in a similar manner as described above with respect to 206 in FIG. 2 where one or more particular programs are identified based on search criteria of the criteria 142.

At 520, the method includes sending a second notification to the user indicating that the one or more second particular programs are scheduled to be broadcasted. In one example, in FIG. 1, the media device 180 may send a notification to the display device 190 indicating that programs have been identified based on automatically generated additional search criteria and that the identified programs have been automatically scheduled to be recorded. In another example, in FIG. 1, the media device 180 or the central video head-end 102 may send an SMS message to the communication device 150, the mobile computing device 160, or both. In a particular embodiment, the notification may be sent to the user as described above with respect to 212 in FIG. 2, with respect to 314 in FIG. 3, with respect to 414 in FIG. 4, or a combination thereof. The method ends at 530.

Figure 6:
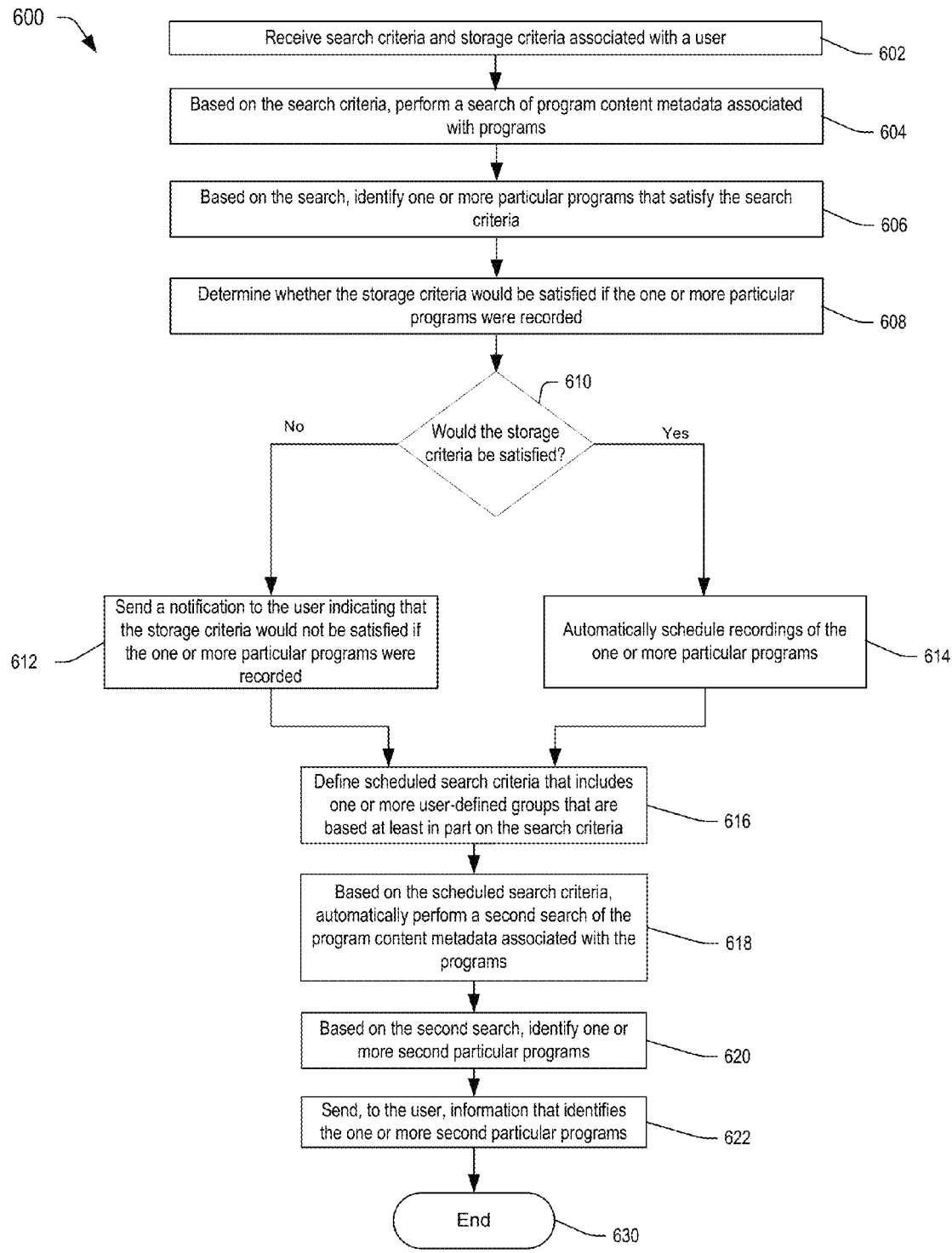
FIG. 6 is a flow chart of a fifth embodiment of a method to automatically record programs based on search criteria.

FIG. 6 is a flow chart of a fifth embodiment of a method 600 to automatically record programs based on search criteria is shown. The method 600 may be performed by the system 100 in FIG. 1.

At 602, the method includes receiving search criteria and storage criteria associated with a user. In a particular embodiment, the search criteria, the storage criteria, or both, may be part of the criteria 142 that is received as described above with respect to 202 in FIG. 2, with respect to 402 in FIG. 4, or both. In another particular embodiment the storage criteria may be part of the criteria 142 that is received as described above with respect to 304 in FIG. 3.

At 604, the method includes performing a search, based on the search criteria, of program content metadata associated with programs. In a particular embodiment, the search may be performed as described above with respect to 204 in FIG. 2.

At 606, the method includes identifying, based on the search, one or more particular programs that satisfy the search criteria. In a particular embodiment, identifying the one or more particular programs may be performed as described above with respect to 206 in FIG. 2.

At 608, the method includes determining whether the storage criteria would be satisfied if the one or more particular programs were recorded. In a particular embodiment, determining whether the storage criteria would be satisfied may be performed as described above with respect to 208 in FIG. 2.

When the storage criteria would not be satisfied, at 610, the method proceeds to 612. When the storage criteria would be satisfied, at 610, then the method proceeds to 614.

At 612, the method includes sending a notification to the user indicating that the storage criteria would not be satisfied if the one or more particular programs were recorded. In a particular embodiment, sending the notification to the user may be performed as described above with respect to 212 in FIG. 2, with respect to 314 in FIG. 3, with respect to 414 in FIG. 4, or a combination thereof.

At 614, the method includes automatically scheduling recordings of the one or more particular programs. In a particular embodiment, automatically scheduling recordings of the one or more particular programs may be performed as described above with respect to 214 in FIG. 2, with respect to 316 in FIG. 3, with respect to 422 in FIG. 4, or a combination thereof.

At 616, the method includes defining scheduled search criteria that includes one or more user-defined groups that are based at least in part on the search criteria. For example, in FIG. 1, the media device 180 or the central video head-end 102 may define scheduled search criteria that include one or more user-defined groups based at least in part on the search criteria of the criteria 142 received from the one or more devices 150, 160, 170,180. In a particular embodiment, the media device 180 or the central video head-end 102 may first process at least a part of the search criteria of the criteria 142 to determine whether any user-defined groups may exist. For example, processing the search criteria may indicate an interest in a particular genre of music, an interest in one or more particular music bands of the particular music genre, and an interest for music events are to be scheduled in the next two weeks. Based on identification of these interests, the media device 180 or the central video head-end 102 may identify a user-defined group, such as a music group. The media device 180 or the central video head-end 102 may define scheduled search criteria based on a determination that a scheduled search should be automatically performed for the music group occasionally or periodically (e.g., every two weeks) because additional music events may be scheduled beyond an initial search timeframe indicated by the search criteria.

At 618, the method includes, based on the scheduled search criteria, automatically performing a second search of the program content metadata associated with the programs. In particular embodiment, the search of the program content metadata may be performed as described above with respect to 204 in FIG. 2, with respect to 306 in FIG. 3, with respect to 406 in FIG. 4, or a combination thereof. In one example, in FIG. 1, the media device 180 or the central video head-end 102 may perform a search of the program content metadata associated with programs accessible via the central video head-end 102. The search of the program content metadata based on the scheduled search criteria may be performed for each individual set of criteria (e.g., the particular music genre and the one or more particular music bands) associated with each of the user-defined groups (e.g., music group) indicated in the scheduled search criteria.

At 620, the method includes, based on the second search, identifying one or more second particular programs. For example, in FIG. 1, the media device 180 or the central video head-end 102 may identify one or more second particular programs based on a search performed using the scheduled second criteria. In a particular embodiment, the one or more second particular programs may be identified based on the programs located during the second search that satisfy at least one user-defined group included in the scheduled search criteria. In another particular embodiment, where storage capacity of the media device 180 is limited, the one or more second particular programs may be identified based on choosing a subset of programs that satisfy the storage criteria of the criteria 142.

At 622, the method includes sending, to the user, information that identifies the one or more second particular programs. In a particular embodiment, the central video head-end 102 may cause the information to be sent to the one or more devices 150, 160, 170, 180 in manner similar to sending a notification as described above with respect to FIGS. 1-5. For example, in FIG. 1, the media device 180 may send, to the display device 190, an information message that is to be displayed at the display device 190 and that identifies a list of the one or more second particular programs that are identified at 620. In another example in FIG. 1, the media device 180 or the central video head-end 102 may cause one or more SMS messages to be sent to the one or more devices 150, 160, 170 associated with the user, where the one or more SMS messages include a list of the one or more second particular programs that are identified at 620. The method ends at 630.

Figure 7:
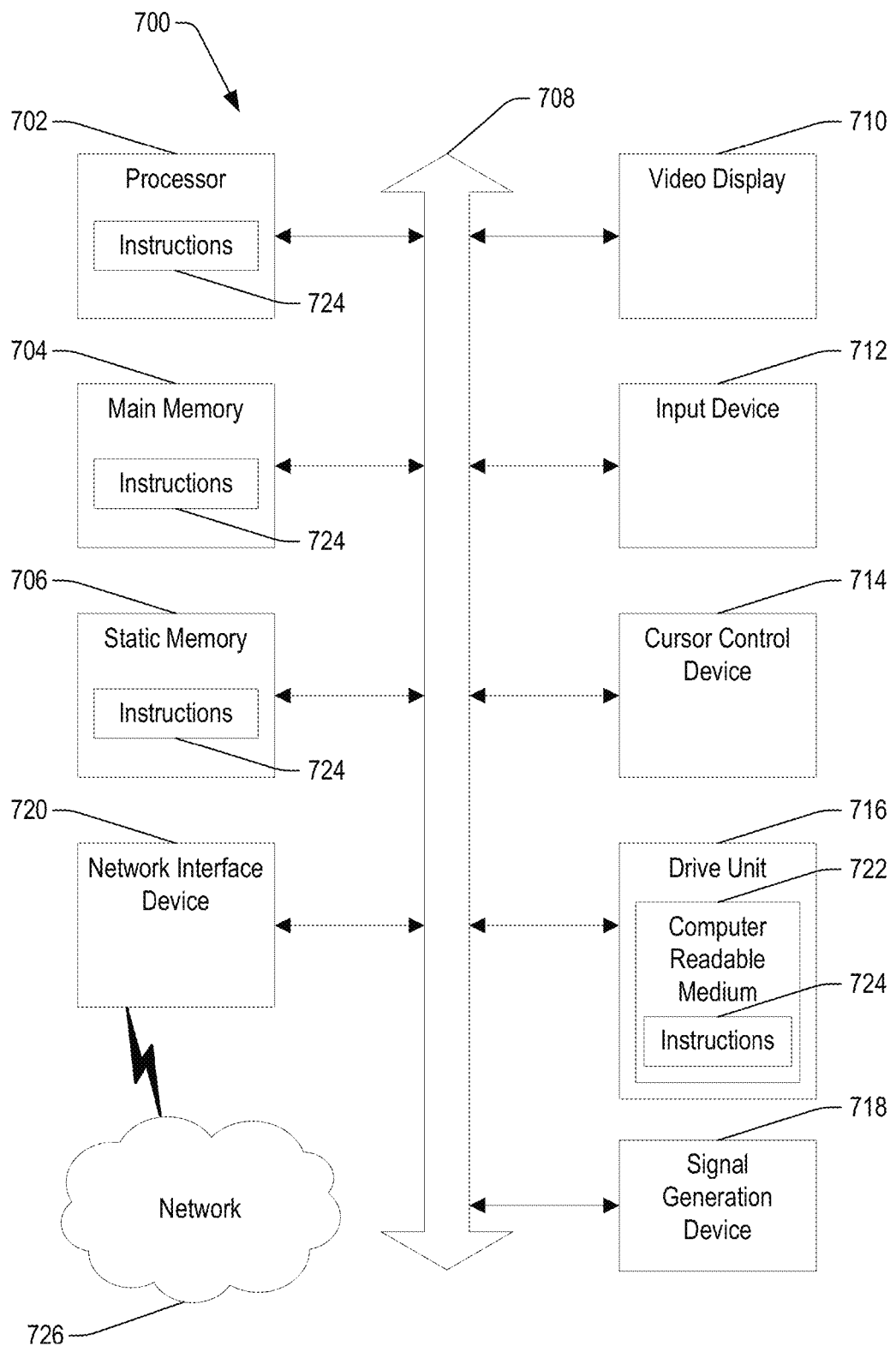
FIG. 7 is an illustration of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within one or more of the components of the central video head-end 102, the Internet communication server 122, the syndication feed server 124, the channel content cache server 132, the regional video distribution system 130, the one or more devices 150, 160, 170, 180, 186, 190, or a combination thereof described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a STB, a PDA, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be the processor 182 of FIG. 1. Moreover, the computer system 700 may include a main memory 704 and a static memory 706, which can communicate with each other via a bus 708. For example, the main memory 704 may be the memory 184 of FIG. 1. As shown, the computer system 700 may further include a video display unit 710, such as a liquid crystal display (LCD), a flat panel display, a solid state display, or a lamp assembly of a projection system. For example, the video display unit 710 may be the display device 190 of FIG. 1. Additionally, the computer system 700 may include an input device 712, such as a keyboard, and a cursor control device 714, such as a mouse. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable non-transitory storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable non-transitory storage medium 722 that stores instructions 724 or receives, stores and executes instructions 724, so that a device (e.g., the central video head-end 102, the region video distribution system 130, the one or more devices 150, 160, 170, 180) connected to a network 726 may communicate voice, video or data over the network 726. The network 726 may be one of the networks 120, 140 of FIG. 1. While the tangible computer-readable storage medium is shown to be a single medium, the term "tangible computer-readable medium" includes a single medium or multiple media, such as a centralized or distributed database, and/or associated caches and servers that store one or more sets of instructions. The term "tangible computer-readable medium" shall also include any non-transitory medium that is capable of storing a set of instructions for execution by a processor or that cause a computer system to perform any one or more of the methods or operations disclosed herein.

In a particular non-limiting, exemplary embodiment, the tangible computer-readable storage medium may include a solid-state memory such as a memory card or other package that houses one or more non-volatile read-only memories. Further, the tangible computer-readable storage medium may be a random access memory or other volatile re-writable memory. Additionally, the tangible computer-readable storage medium may include a magneto-optical or optical medium, such as a disk or tapes or other storage device. Accordingly, the disclosure is considered to include any one or more of a tangible computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards and protocols for communication include RTP, TCP/IP, UDP/IP, HTTP, CDMA, TDMA, FDMA, OFDMA, SC-FDMA, GSM, EDGE, evolved EDGE, UMTS, Wi-Max, GPRS, 3GPP, 3GPP2, 4G, LTE, 4G-LTE, HSPA, HSPA+, and Institute of Electrical and Electronics Engineers (IEEE) 802.11x. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving search criteria, wherein the search criteria are generated based on interest information associated with a user, and wherein the interest information includes a user selected interest;
    receiving storage criteria, wherein the storage criteria include a threshold number, and wherein the threshold number corresponds to a recording limit for programs that satisfy the search criteria;
    identifying a syndicated feed associated with the user selected interest;
    generating additional search criteria based on content of the syndicated feed, wherein the additional search criteria includes a keyword identified by the syndicated feed;
    performing a search, based on the search criteria and based on the additional search criteria, of program content metadata associated with the programs;
    based on the search, identifying a particular program for automatic recording that satisfies the search criteria and the additional search criteria;
    determining whether the storage criteria would be satisfied if the particular program is recorded;
    in response to determining that the storage criteria would not be satisfied if the particular program is recorded, sending a notification indicating that the storage criteria would not be satisfied if the particular program is recorded; and
    in response to determining that the storage criteria would be satisfied if the particular program is recorded, automatically scheduling recording of the particular program.

2. The method of claim 1, wherein the storage criteria includes a date by which the recordings are to be recorded.

3. The method of claim 1, wherein the interest information includes an interest group of a social network account associated with the user, and wherein the search criteria are generated based on like information, dislike information, or both, associated with the social network account.

4. The method of claim 3, wherein the search criteria is generated based on input from another user of a social network associated with the social network account, the input including a recommendation, a comment, a review, a rating, or a combination thereof.

5. The method of claim 3, further comprising:
    automatically generating second additional search criteria based on the search criteria and a second interest group that is identified based on a location associated with the user;
    identifying a second particular program that satisfies the second additional search criteria; and
    sending a second notification indicating a scheduled presentation time of the second particular program.

6. The method of claim 1, wherein the user selected interest is associated with a sports team, and wherein the keyword includes a name of a player associated with the sports team, the name of the player identified by the syndicated feed.

7. The method of claim 1, wherein the user selected interest is associated with an actor, and wherein the keyword includes a name of a television show associated with the actor, the name of the television show identified by the syndicated feed.

8. The method of claim 1, wherein the user selected interest is associated with a band, and wherein the keyword includes a name of a television show associated with the band, the name of the television show identified by the syndicated feed.

9. The method of claim 1, further comprising:
    defining scheduled search criteria that include a user-defined group that is based on the search criteria;
    based on the scheduled search criteria, automatically performing a second search of the program content metadata;
    based on the second search, identifying a second particular program; and
    sending, to the user, information that identifies the second particular program.

10. The method of claim 1, further comprising:
    in response to determining that the storage criteria would not be satisfied if the particular program satisfying the search criteria is recorded, identifying a suggested program that satisfies the storage criteria and that partially satisfies the search criteria; and sending, to a device associated with the user, information that identifies the suggested program.

11. The method of claim 10, further comprising scheduling the suggested program for recording in response to receipt of user input indicating to record the suggested program.

12. The method of claim 1, wherein the storage criteria includes a user input value.

13. The method of claim 1, wherein the search identifies a group of programs that satisfy the search criteria, wherein a number of programs in the group is greater than the threshold number, and further comprising determining a subset of programs from the group to automatically record, wherein each program of the subset satisfies the storage criteria, and wherein a number of programs in the subset is equal to or less than the threshold number.

14. The method of claim 9, further comprising periodically performing the second search.

15. The method of claim 10, wherein identifying the suggested program that satisfies the storage criteria and that partially satisfies the search criteria includes adjusting a record date specified in the search criteria, adjusting an indication of new and old episodes in the search criteria, or a combination thereof.

16. A system comprising:
a processor; and
a memory accessible to the processor, the memory including instructions that, when executed by the processor, cause the processor to perform operations including:
receiving search criteria, wherein the search criteria are generated based on interest information associated with a user, and wherein the interest information includes a user selected interest;
identifying a syndicated feed associated with the user selected interest;
generating additional search criteria based on content of the syndicated feed wherein the additional search criteria includes a keyword identified by the syndicated feed;
receiving storage criteria, wherein the storage criteria include a threshold number, and wherein the threshold number corresponds to a recording limit for programs that satisfy the search criteria and based on the additional search criteria;
performing a search, based on the search criteria and the additional search criteria, of program content metadata associated with the programs;
based on the search, identifying a particular program for automatic recording that satisfies the search criteria;
determining whether the storage criteria would be satisfied if the particular program is recorded; and
in response to determining that the storage criteria would be satisfied if the particular program is recorded, automatically scheduling recording of the particular program.

17. The system of claim 16, further comprising in response to determining that the storage criteria would not be satisfied if the particular program is recorded:
sending a first notification indicating that the storage criteria would not be satisfied;
identifying a second program that satisfies the storage criteria and satisfies a portion of the search criteria;
sending a second notification indicating the second program;
receiving input to record the second program in response to the second notification; and
scheduling recording of the second program in response to the input.

18. The system of claim 16, wherein the storage criteria is received from a mobile communication device associated with the user or a media device associated with the user.

19. The system of claim 16, wherein the storage criteria includes a date by which a number of recordings, up to the threshold number, are to be recorded based on the search criteria.

20. A computer-readable storage device comprising instructions that, when executed by a processor, cause the processor to perform operations comprising:
receiving search criteria, wherein the search criteria are generated based on interest information associated with a user, and wherein the interest information includes a user selected interest;
receiving storage criteria that include a threshold number, wherein the threshold number corresponds to a recording limit for programs that satisfy the search criteria;
identifying a syndicated feed associated with the user selected interest;
generating additional search criteria based on content of the syndicated feed, wherein the additional search criteria includes a keyword identified by the syndicated feed;
performing a search, based on the search criteria and based on the additional search criteria, of program content metadata associated with programs;
based on the search, identifying a particular program for automatic recording that satisfies the search criteria and the additional search criteria;
determining whether the storage criteria would be satisfied if the particular program is recorded;
in response to determining that the storage criteria would not be satisfied if the particular program is recorded, sending a notification indicating that the storage criteria would not be satisfied; and
in response to determining that the storage criteria would be satisfied if the particular program is recorded, automatically scheduling recordings of the particular program.

* * * * *